Feb. 15, 1949.  F. G. PATTERSON  2,461,998
PULSE ECHO SYSTEM AND PULSE INDICATING MEANS
Filed Nov. 17, 1943  3 Sheets-Sheet 1

Fig. 1.

Inventor:
Franklin G. Patterson,
by Harry E. Dunham
His Attorney.

Fig. 2.

Feb. 15, 1949.   F. G. PATTERSON   2,461,998
PULSE ECHO SYSTEM AND PULSE INDICATING MEANS
Filed Nov. 17, 1943   3 Sheets-Sheet 3

Inventor:
Franklin G. Patterson,
by Harry E. Dunham
His Attorney.

Patented Feb. 15, 1949

2,461,998

UNITED STATES PATENT OFFICE 2,461,998

PULSE ECHO SYSTEM AND PULSE INDICATING MEANS

Franklin G. Patterson, Schenectady, N. Y., assignor to General Electric Company, a corporation of New York Application November 17, 1943, Serial No. 510,619

14 Claims. (Cl. 343—13)

My invention relates to pulse echo systems for determining distance.

In such systems recurrent pulses are transmitted and echoes thereof are received from remote objects during the intervals between the transmitted pulses. Commonly these echoes are indicated upon the viewing screen of a cathode ray device in space sequence corresponding to the time sequence in which they are received. In certain systems the ray of the cathode ray device is deflected across the screen beginning simultaneously with the radiated pulse, or at a time fixed relative thereto, and is modulated during its deflection by the received echoes in the time sequence in which they arrive. In this way indications of the different echoes received from distances within the range of the equipment are produced upon the screen in space sequence corresponding to the time sequence in which they arrive.

Commonly where such indications are employed a further cathode ray device is used in which the cathode ray is deflected across the screen in a very brief portion, or aperture, of the time during which echoes are received, this deflection beginning at a time variable with respect to the time of transmission of the preceding pulse. In this way this second device produces on its viewing screen a much larger indication of an echo also indicated on the first screen and which is received during the brief aperture of time over which the second device operates.

On the second device the indication of an echo from a particular remote object may occur at any point in the trace of the cathode ray on the screen, the position depending upon the time with reference to the transmitted pulse when the deflection is begun. Accordingly the position of the echo indication on the screen is not of itself an indication of distance to the remote object producing the echo.

An object of my invention is to produce electronically upon the screen of such a device a calibration dividing the portion of the whole time interval during which the ray of the device is deflected across the screen into equal arbitrary units fixed in time relative to the time of the transmitted pulse. This calibration may appear on the screen in juxtaposed relation to the echo indication so that the position of the echo indication may be compared accurately with time interval indicia or graduations of the calibration. Since these calibration indicia are fixed in time relative to the transmitted pulse, they move across the screen in unison with the echo indications as the time of the beginning of the deflection is varied relative to the transmitted pulse, each echo indication being maintained in fixed relation with respect to the calibration. In accord with my invention this calibration is then related to the transmitted pulses in terms of the units represented by the calibration indicia, as in terms of distance or range to the remote object producing the echo. In this way this calibration becomes a yardstick measuring the interval between the radiated pulse and any echo appearing on the screen, the zero end of the yardstick being positioned at the transmitted pulse and only that portion of the yardstick in the neighborhood of the echo appearing on the screen.

A further object of my invention is to number the indicia of this yardstick in terms of distance from zero, corresponding to zero distance, to the full length of the yardstick, corresponding to the maximum range of the equipment. Only a small part of the yardstick appears on the screen at any time and an object of my invention is to maintain the correctness of the numbering of the portion which appears during variation in the time of the beginning of the deflection of the ray with respect to the transmitted pulse. In this way the distance from which the echo is received may be accurately determined by interpolation between the position at which the echo appears and the numbered indicia of the calibration or yardstick. In accord with my invention this numerical identification of the indicia of the calibration may be provided by a calibrated scale movable in front of the viewing screen in unison with the variation in the time of the beginning of the deflection whereby the scale moves across the screen in unison with the calibration and the echo indications.

Various other objects of my invention obtained through this form of indication will appear as the description of my invention proceeds.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1 and 2 taken together represent an embodiment of my invention.

Figure 1:
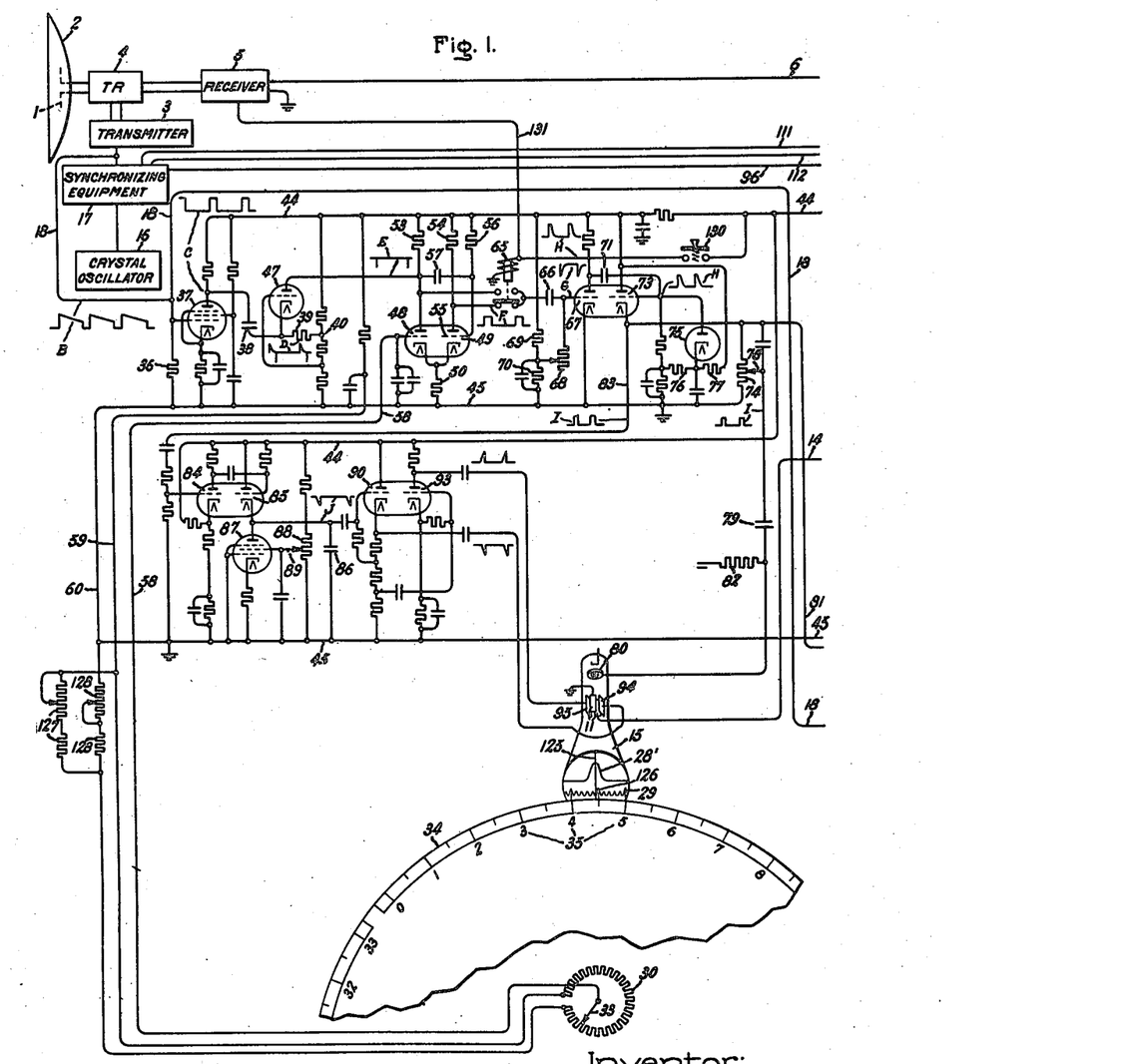

Referring to Fig. 1 of the drawings I have indicated in the upper left hand corner thereof an antenna 1 arranged within a parabolic reflector 2 to which pulses are supplied by a transmitter 3 for radiation through space. These pulses may, for example, be pulses of one microsecond duration occurring at a frequency of from 500 to 2000 cycles per second and having a wave length in the neighborhood of 10 centimeters, for example. These pulses are radiated through space and impinge upon remote objects from which they are reflected to produce echoes intercepted by the antenna 1. Such echoes are supplied through equipment 4 to the receiver 5, equipment 4 merely comprising equipment, commonly known as Transmit-Receive device or a TR Box, to protect the receiver from the intense pulses of the transmitter. Various suitable devices are known to the art and the construction of equipment 4 forms no part of my invention. For more detailed information, reference is made to Chapter XI of "Principles of radar" by the M. I. T. Radar School Staff (Second Ed., McGraw-Hill, 1946), entitled "Transmit-Receive Devices." The received echoes are supplied over the conductor 6 and through amplifier 8 (Fig. 2) between the vertical deflecting electrodes 9 of a cathode ray device 10. These received echoes are also supplied through amplifiers 7 and 13 and over conductor 14 to the vertical deflecting electrodes 11 of a cathode ray device 15 (Fig. 1).

The pulses produced by the transmitter 3 and radiated from the antenna are synchronized with the oscillations produced by a crystal controlled oscillator 16 and which are supplied to certain synchronizing equipment 17 which operates to synchronize the pulses produced by the transmitter and to supply voltage waves of proper form and frequency for synchronization of the remaining portion of the equipment. The internal circuits of synchronizing equipment 17 may be of various forms well-known to those skilled in the design of television and pulse systems and are therefore not illustrated in detail. The operation of this equipment will readily be understood by reference to the various waveforms it supplies, in conjunction with the detailed description of operation below. This synchronizing equipment supplies a pulse wave, produced for example by a multivibrator synchronized from oscillator 16, to transmitter 3 to control the transmitted pulses. The same wave is also supplied over conductor 18 to synchronize a sweep generator 19 associated with the cathode ray device 10. This sweep generator generates a sawtooth wave which is supplied between the horizontal deflecting electrodes 20 of the cathode ray device to deflect the ray across the screen during the interval when echo pulses are received. Thus this ray may be deflected from left to right across the screen during the interval beginning with transmission of the radiated pulse and continuing over the interval required for reception of echoes from the greatest distance within the range of the equipment. Thus on the screen is produced the horizontal trace 24 having vertical deflections therefrom representing the radiated pulse and various received echoes. For example, the deflection 25 may represent the radiated pulse and deflections 26 different received echoes. These echoes appear on the screen in space sequence corresponding to the time sequence in which they are received and thus their position is representative of the distance from which the echoes are received.

The range indicator 15 operates similarly to the indicator 10 but its horizontal deflection occurs in a very brief interval of the time over which the deflection in the device 10 occurs, this interval being variable in time with respect to the radiated pulses. Thus, for example, the ray in device 15 may be deflected across the full width of the screen during the brief interval represented by the downward deflection 27 indicated on the viewing screen 10. Thus the single echo indicated at 28 on the viewing screen 10 is indicated at 28' on the viewing screen of the cathode ray device 15, this echo appearing in much enlarged form by reason of the greater space on the screen of device 15 given to the brief time interval during which this device operates.

Since the time interval during which the device 15 operates is variable with respect to the transmitted pulse, the position of the deflection 28' on the screen of itself does not constitute an indication of distance.

Also produced upon the screen of device 15 is a calibration 29. Indicia are provided by vertical deflections in this calibration, produced by timing pulses of constant frequency which are supplied to the vertical deflection electrodes over conductor 14 and which are maintained in fixed time relation with respect to the radiated pulse. Thus the deflections of this calibration have a fixed relation to the time of the radiated pulses and to the time of any received echo. These deflections divide the time interval over which the ray of this device is deflected across the screen into equal arbitrary units corresponding to the period between the pulses of wave 29, these units thus forming units of distance to any remote object from which an echo indicated on the screen is received.

Below the cathode ray oscillograph I have represented a potentiometer 30 having a contact 33 rotatable therewith to vary the time at which the deflection of the ray in device 15 begins relative to the transmitted pulse. This movable contact 33 is provided with a dial 34 which rotates simultaneously therewith and the outer periphery of which carries a calibrated scale 35. This dial 34 is so positioned that its outer periphery passes in its rotation before the viewing screen of the cathode ray device and the numerical scale markings thereon agree with indicia produced in the calibration 29 on the viewing screen. As contact 33 is rotated to vary the time when the deflection of the ray of device 15 starts in the period between radiated pulses, this calibration 35 moves across the screen. Simultaneously the scale 29 moves across the screen as does the echo indication 28', these three indications all moving in unison and in fixed relation to each other. Thus the distance from which the echo is received producing the deflection 28' may be read directly from the scale 35 aided by interpolation with the calibration 29. For example, if the scale 35 be calibrated in terms of thousands of yards, then the echo 28' is indicated as received from an object 4,450 yards distant from the transmitter.

For convenience each fifth indicia of the calibration 29 is made larger than the intermediate indicia for aid in interpolation between units of the scale 35.

Figures 3, 4, 5:
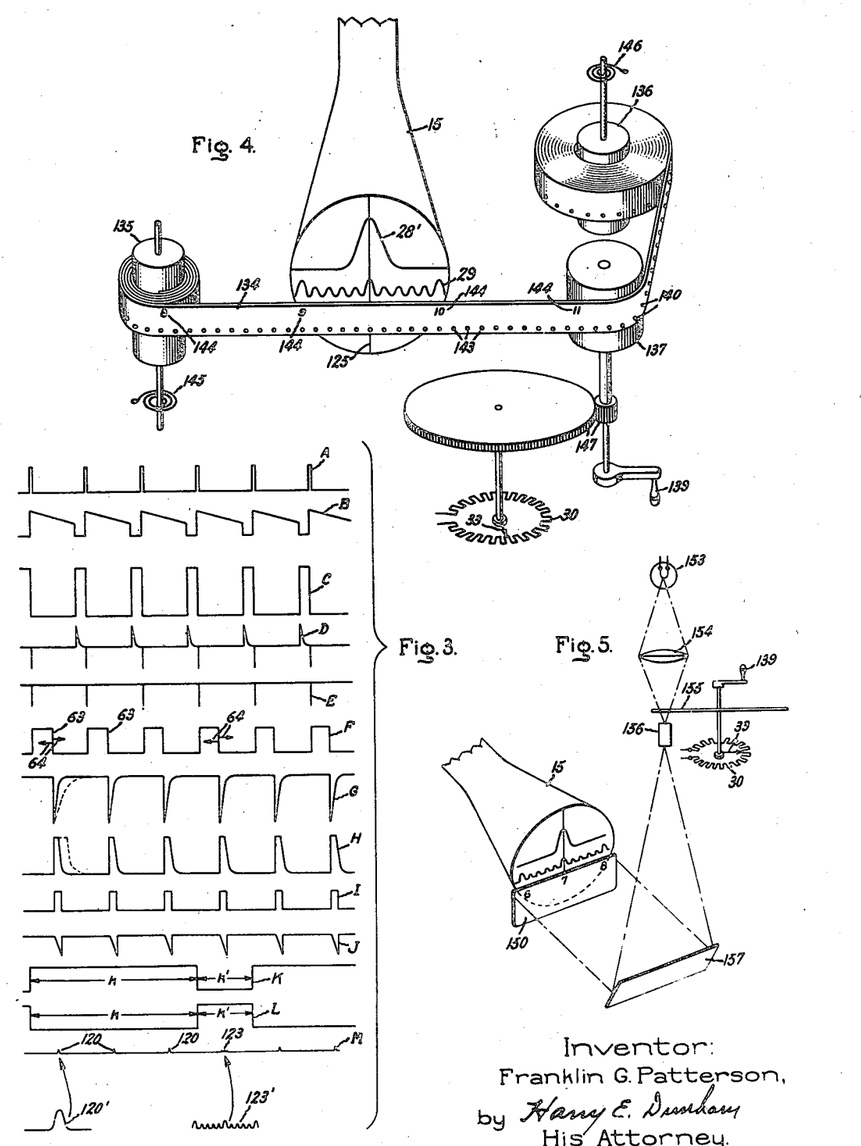
Fig. 3 represents certain characteristics pertaining to its operation.
Figs. 4 and 5 represent modifications.

Having now generally indicated the results secured, I shall proceed with a detailed description of the equipment for producing indications of the type indicated. In Fig. 3 I have indicated at A a pulse wave which may be taken to represent the pulses radiated by the transmitter. The synchronizing equipment 17 produces the pulse wave represented at B in Fig. 3 which it supplies to synchronize the transmitter 3 and over conductor 18 to synchronize the sweep generator 19 for indicator 10, as previously described. This wave is also supplied across resistance 36 between the control electrode and cathode of a discharge device 37. This device comprises part of equipment represented in Fig. 1 to produce the sweep voltages for cathode ray device 15.

The pulses of wave B are of sufficient intensity to cause device 37 to pass current of saturating value so that its anode potential drops to a substantially fixed value during each positive pulse of the wave B. Thus a voltage wave appears on the anode of this device of the form indicated at C in Figs. 1 and 3, this wave being a substantially square wave. This voltage is supplied through a small capacitance 38 and a resistance 39 the latter of which is connected to an intermediate point on a potentiometer 40 connected between a positive bus 44 and a grounded bus 45. This positive bus extends to the positive terminal of a source of operating potential 46 the negative terminal of which is grounded. Due to the differentiating action of the condenser 38 and resistance 39 on the positive portion of the cycle and condenser 38 and resistance 39 shunted by device 47 in series with resistance 53 on the negative portion, the wave C is converted to a wave of the form indicated at D at the cathode of device 47 driving that cathode negative for a very short pulse at the beginning of each negative pulse of wave C and positive for a short pulse at termination of each of the negative pulses of wave C. Of course when device 47 is conducting, its resistance added to that of resistance 39 is much lower than that of resistance 39 producing the sharp negative pulses of the wave D. The positive pulses of wave D on the cathode of device 47 have no effect since the device is already nonconducting. The negative pulses of wave D on the cathode thereof cause it to pass current, producing a drop in voltage on its anode. Thus only the negative pulses of wave D are reproduced on the anode of this device. Thus a wave is formed as indicated at E in Fig. 3 on the anode of device 47. This wave comprises sharp negative pulses occurring simultaneously with each radiated pulse. This wave E controls a delay multivibrator comprising a pair of electron discharge devices 48 and 49 represented in Fig. 1 in the same envelope.

This multivibrator is of conventional type, the cathodes of the two devices being connected together and to ground through a resistance 50 and the anodes thereof being connected to the positive bus through respective resistances 53 and 54. The control electrode 55 of device 49 is connected to the positive bus through a resistance 56 and to the anode of device 48 through a capacitance 57.

This multivibrator determines the delay period after radiation of the transmitted pulse before the deflection of the ray of device 15 begins. In its operation when a negative pulse of the wave E is supplied to the anode of device 48, due to the charge on condenser 57 the control electrode of device 49 is driven negative, thereby interrupting the current in this device and in resistance 50. Thus the potential previously existing on resistance 50 disappears and device 48 therefore becomes conducting. The anode of device 48 thus drops in potential maintaining the control electrode of device 49 negative. During the required delay period condenser 57 discharges through resistances 53 and 56 sufficiently to permit device 49 to become conducting. Current then again flows therein and in resistance 50. This again renders device 48 nonconducting, its anode potential rising and increasing the positive voltage on the control electrode of device 49, this action of course being accumulative. Thus a square wave of voltage is produced upon the anode of device 49, this wave being represented at F in Figs. 1 and 3.

The length of the positive pulses of the curve F of Fig. 3 is dependent upon the time required for condenser 57 to discharge sufficiently to permit device 49 to become conducting. This of course depends upon the magnitude of current flowing in device 48 when device 49 is nonconducting since it is that magnitude of current which determines the potential on the anode of device 48. This current is controlled by the potential on the control electrode of device 48. This control electrode is connected through conductor 58 to the variable contact 33 on resistance 30 the latter of which is connected through conductors 59 and 60 between the positive bus 44 and ground. Thus the duration of the positive pulses F may be varied from zero to a period sufficient for a radiated pulse to travel to the most remote object within the range of the equipment and return, this variation being effected simply by variation of the contact 33 on potentiometer 40. This means that the lagging edges 63 of each of the positive pulses of the wave F may be varied to the left or to the right as desired in accord with the range of the remote object from which echoes are to be received. This variation is indicated in the curve F by the oppositely extending arrows 64.

These positive pulses of wave F are supplied through the lower contacts of relay 65 and condenser 66 to the control electrode of a further discharge device 67, the latter control electrode being connected through a variable resistance 68 to a point between resistances 69 and 70 which are connected in series across the source of operating potential. Upon termination of each positive pulse of the wave F the grid of discharge device 67 is driven negative by action of the condenser 66 which rapidly charges through variable resistance 68 to produce a wave upon the control electrode of device 67 having the form indicated at G in Fig. 3. The width of these negative pulses of the wave G is dependent upon the time required for condenser 66 to charge through resistance 68 which is variable to vary the width of these pulses.

The negative pulses of the wave G on the control electrode of device 67 drive this device to cutoff and interrupt current therein for an interval producing positive pulses on the anode of the form of the pulses of the wave H of Fig. 3. These positive pulses are supplied through condenser 71 to the control electrode of discharge device 73 the anode of which is connected to the positive bus 44 and the cathode of which is connected to ground through resistance 74. They are also supplied to the anode of a diode 75, the cathode of which is connected to a point of fixed potential between resistances 76 and 77. Device 73 is normally practically nonconductive and its control electrode is prevented from becoming more positive than a predetermined amount by action of the diode 75 which becomes conducting and prevents the potential on the grid of device 73 from exceeding a predetermined positive value. In this way short positive pulses represented at I in Fig. 3 appear on the resistance 74, these pulses being the short aperture, or gate, pulses which are supplied from a variable contact 78 thereon through condenser 79 to the control electrode 80 of the cathode ray device 15 thereby to turn the ray of that device on for the duration of these pulses. It is extinguished at all other times by the negative portion of wave I added to suitable bias voltage supplied through resistance 82.

These square pulses I are also supplied over conductor 83 to the input of an amplifier 84 by which they are amplified and supplied to the control electrode of a further discharge device 85. The anode of this latter device is connected to the positive bus 44 and its cathode is connected through a condenser 86 to the ground bus 45, this condenser being shunted by a resistance comprising the anode-to-cathode impedence of a pentode 87. The positive pulses of wave I on conductor 83 are reversed in polarity by amplifier 84 and supplied as negative pulses to the control electrode of device 85. That device is thus rendered nonconducting during the positive pulses of the wave I, permitting condenser 86 to discharge through device 87 which is conductive by reason of positive voltage supplied to the control electrode thereof from a potentiometer 88. The rate of this discharge is constant by reason of the constant current characteristic of such discharge device and may be adjusted by adjustment of the contact 89 on this potentiometer. During the intervals between the pulses I the control electrode of device 85 is positive and the condenser is immediately charged and is maintained charged until the next pulse of the wave I occurs. In this way a sawtooth wave such as that indicated at J appears across condenser 86. This sawtooth wave is amplified by amplifiers 90 and 93. The potential on the cathode of amplifier 90 is supplied to the right hand deflecting electrode 94 of device 15 and that on the anode of device 93 is supplied to the left hand deflecting electrode 95 of the cathode ray device 15.

Now it will be seen that all the pulses of waves G, H, I and J of Fig. 3 may be moved to the left and to the right, i. e., advanced or retarded in time, in accord with the variation in the duration of the positive pulses of the wave F. When they are at the extreme left position they agree in time with the radiated pulses represented by the wave A, and as they are moved to the right they occur during brief apertures of time variably spaced with respect to the radiated pulses and may occur at any time thereafter variable to a maximum time dependent upon the range of the equipment.

The aperture pulses of wave I, which are produced on resistance 74 and which operate to turn the ray of device 15 on and to produce the voltages which sweep the ray of this device across the screen during the aperture, are also supplied over conductor 81 to the amplifier 8 where it is mixed with the received echo. In this way these pulses produce the downward deflection 27 on the screen of device 10, which identifies the particular echo 28 which is indicated on the device 15. This aperture pulse may be of but a few microseconds duration, as, for example, 6 microseconds, so that a particularly remote echo indicated on the screen 10 may be segregated and indicated in a greatly enlarged way on the screen of device 15.

Figure 2:
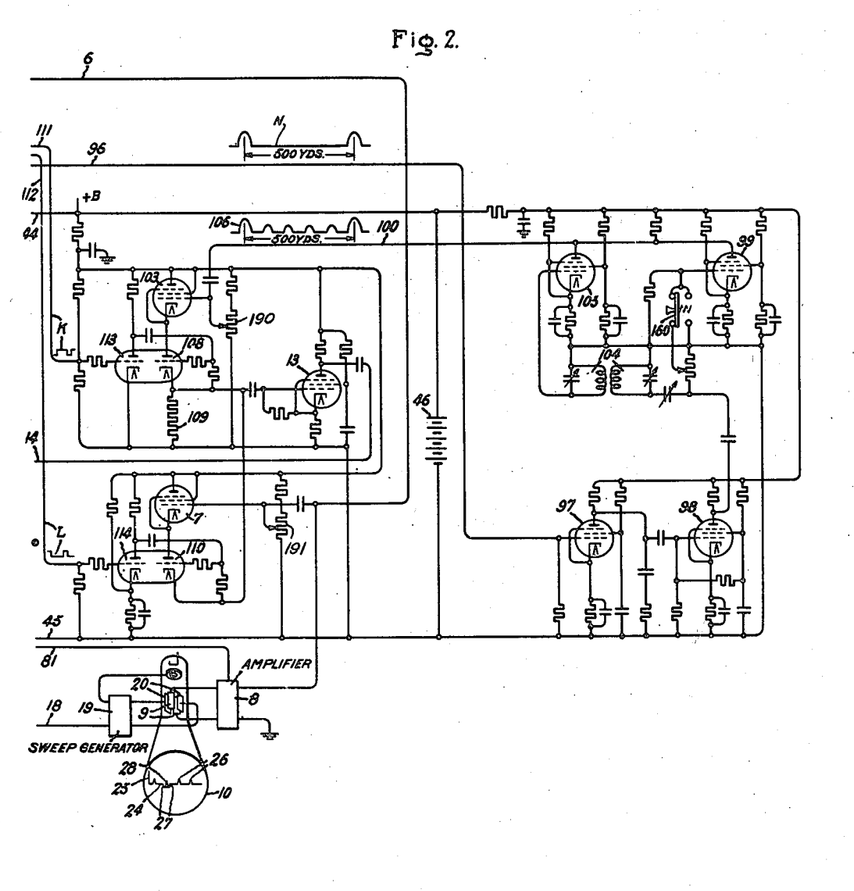

The portion of the equipment of Fig. 2 at the left of source 46 comprises equipment for supplying between the vertical deflecting electrodes of the cathode ray device 15, alternately, the received echo and the timing pulses which produce the indicia or range deflections of calibration 29. The pulses which produce the indicia of calibration 29 are controlled by a pulse wave N (Fig. 2) generated in the synchronizing equipment 17. The wave N supplied over conductor 96 comprises pulses, which may for example be supplied by a multivibrator contained within equipment 17 and synchronized from oscillator 16, these pulses recurring at a frequency of 327.76 kilocycles and thus having a period equal to the time required for a pulse to travel to a remote object 500 yards away and return. Thus adjacent pulses in this wave are spaced apart by an interval corresponding to 500 yards of distance. This wave is supplied through conductor 96, amplifiers 97, 98 and 99 to conductor 100 leading to the control electrode of discharge device 103. The output from amplifier 98 is also supplied through a pair of coupled tuned circuits 104 and an amplifier 105 to this same conductor 100. The circuits 104 are tuned to the fifth harmonic of the 327.76 kilocycle wave and thus generate a further wave, of five times the frequency of the wave amplified by amplifier 99 and which is supplied to the conductor 100 and which combines with the wave supplied by the amplifier 99 to produce a wave of the form indicated at 106 in Fig. 2. It will be seen that each fifth pulse of this wave is of larger amplitude than the intermediate pulses. These fifth pulses are spaced apart by 500 yards as previously described and the interval therebetween is divided into five equal intervals by the smaller pulses, these latter pulses thus being spaced apart by intervals corresponding to 100 yards.

The received echo which appears on conductor 6 is also supplied to a discharge device 7, which is in a circuit similar to that of the device 103. The cathode of device 103 is connected to ground through discharge device 108 and a resistance 109, and similarly the cathode of discharge device 7 is connected to ground through discharge device 110 and this same resistance 109. The devices 108 and 110 act as switches alternately operative to cause the transmission to resistance 109 of, first, the pulses of the wave 106 and then the echo pulses, alternately, throughout the operation of the equipment.

These devices 108 and 110 are controlled by square pulse waves represented at K and L in Fig. 3 and which are supplied with opposite polarities over conductors 111 and 112 from the synchronizing equipment through respective amplifiers 113 and 114 to the control electrodes of the devices 108 and 110 to render those devices alternately conducting. These square pulse waves K and L may, for example, be supplied by a push-pull output derived from a multivibrator contained within equipment 17, this multivibrator again being synchronized from oscillator 16. Thus when the control electrode of device 108 is rendered positive with respect to its cathode by the square wave K received over conductor 111 (during the interval k'), it connects the cathode of device 103 to ground through resistance 109. Device 103 then acts as a cathode follower to reproduce the wave 106 upon the resistance 109. This wave 106 is then amplified by amplifier 13 and supplied over conductor 14 to the vertical deflecting electrodes of the cathode ray device 15 where it operates to produce the calibration 29 upon the viewing screen.

Of course, during this same time interval $k'$ the control electrode of device 110 is rendered negative by the square wave L received over conductor 112 with the result that the signal wave comprising received echoes supplied over conductor 6 to the grid of device 7 are not repeated on resistance 109.

During an alternate interval, however, when the control electrode of device 108 is negative and that of device 110 is positive by reason of the square waves received over conductors 111 and 112 (i. e., during the interval $k$), the echo supplied over conductor 6 is reproduced upon resistance 109 and is amplified by amplifier 13 and supplied between the vertical deflecting electrodes of the device 15. The composite wave which is produced upon resistance 109 and supplied between the vertical deflecting electrodes of the cathode ray device 15 is shown at M in Fig. 3 in which the pulses 120 represent echo pulses and the brief portions of the wave M at 123 represent the wave 106. To better illustrate the character of this wave one of the portions 120 is shown in enlarged form at 120' and one of the portions 123 is shown in an enlarged way at 123'.

It will be noticed from Fig. 3 that the waves K and L comprise portions $k$, $k'$ the former being about three times longer than the latter so that the echo pulses 120 are applied to the cathode ray device during three successive aperture pulses of the wave I while the range calibration wave 106 is applied during but one aperture. Of course, it will be understood that this calibration wave is one generated in the equipment while the echo wave is one received through space due to reflection from a remote object. It has been found that when these waves are applied to the cathode ray device, in these respective proportions, satisfactory indications are produced upon the screen.

It will further be observed that during the interval $k'$, when triode 108 is rendered fully conducting, the current through resistance 109 is dependent upon the impedance of pentode 103; and during the alternate interval $k$, when triode 110 is fully conducting, the current through resistance 109 is dependent upon the impedance of pentode 7. If these impedances are equal (in the absence of the superimposed echo or timing impulses), then the traces 28' and 29 will lie on substantially the same horizontal base line. However, any desired degree of vertical separation may readily be obtained by varying the grid bias potentials on the pentodes 103 and 7 by adjusting the taps on bias potentiometers 190 and 191. Preferably, these are adjusted so that calibration trace 29 lies closely adjacent the calibrated scale 34 and the echo trace 28' lies on an axis above it, as represented in Figs. 1, 4 and 5.

It will now be seen that the wave 106, generated in the equipment, acts precisely as a yardstick to measure the time interval between the radiated pulse, which may be of one microsecond duration, and the receipt of the echo. This wave is of course closely synchronized with the radiated pulses, each radiated pulse being radiated in accurate time phase relation with respect to the wave 106. This synchronization is effected within the equipment 17. By projecting both the wave 106 and the received echo upon the cathode ray device to produce both the echo indication 28', and the calibration 29, the phase or time relation between the returning echo and the wave 106 as reproduced on the viewing screen at 29 can be immediately ascertained by observation of the eye.

If disk 34 be rotated clockwise with contact 33 until resistance 30 is entirely removed from the circuit between the control electrode of the device 48 and ground, then the delay produced by the delay multivibrator 48, 55 is zero; that is, the pulses of the wave F are of zero duration. That is, the negative pulses of wave E drive the grid of device 49 negative interrupting the current therein, but since the grid of device 48 is now connected to the terminal of resistance 30 which is connected through resistances 128 to ground, this device conducts so little current that its anode remains at sufficiently high potential that device 49 is not maintained nonconductive after termination of the negative pulses of wave. Thus all of the pulses represented by waves G, H, I and J are moved to the left to agree in time with the pulses of wave E. The calibration 29 is still present upon the screen and the radiated pulse is indicated thereon bisected by a fixed vertical line 125 marked on the face of tube 15. This line now also bisects one of the larger deflections 126 of the calibration, this larger deflection being in alignment with the zero index about the periphery of the dial 34. Adjustment for this condition may be effected by adjustment of resistances 127 in shunt to resistance 30 and by adjustment of resistances 128. This corresponds to placing the zero end of the yardstick at the time of the radiated pulse.

The dial may now be turned counterclockwise, each of its numerical scale markings, designated 1, 2, 3, 4, etc., coinciding with one of the larger deflections 126 of the calibration. These spaces may represent 1,000 yards in space; that is, a time interval required for a radiated pulse to travel a distance of 1,000 yards and return to the equipment. Of course, during this rotation the calibrated scale 35 moves to the left across the screen until finally an echo indication, such as that shown at 28', appears. The operator may then read the distance from which the echo is received directly from the scale 35 and calibration 29. Thus with the indication as shown on the drawing the echo is received from a distance of 4,450 yards.

Thus the dial constitutes a means for placing a numerical value upon each of the range indicia comprising the calibration 29 appearing upon the viewing screen so that the position of any echo in time with respect to the radiated pulse may be read directly from the calibration 29 and the dial 34.

This indication is effected by direct comparison of the time of the received echo and the pulses of wave 106 which are accurately controlled in time. Thus one undesired effect, such as temperature changes, affecting phase shifting apparatus, etc., are obviated, the comparison being one of time directly against time upon the viewing screen of the cathode ray device.

Of course recalibration of the apparatus is sometimes required and this may be effected as previously described by rotating the dial 34 to the position where the zero index coincides with the vertical line 125 on the viewing screen. The radiated pulse then appears upon the screen and resistors 127 and 128 may be adjusted until the zero index agrees with the vertical line 125 and with one of the stronger of the deflections of the calibration 29. Of course, the phasing of the calibration pulses 106 with the radiated pulses is effected by suitable adjustments in equipment 17. When these adjustments are completed, the zero index on the dial, the deflection 28' produced by the radiated pulse and one of the stronger deflections of calibration 29 align with each other.

Subsequent calibrating adjustments may be effected without turning the dial simply by operating the key 130 to close its contacts thereby energizing relay 65 and a similar relay in the receiver over line 131 to reduce the sensitivity of the receiver. These relays are connected between the positive bus 44 and ground through key 130. Operation of relay 65, in effect, removes the delay produced by the delay multivibrator 48, 55 and thus removes the pulses 63 of the wave F. It will be seen that when the winding of relay 65 is energized the anode of discharge device 48 is connected to the control electrode of device 67 rather than the anode of device 49. Thus the negative pulses of wave E are applied directly to the control grid of device 67 rather than the delayed negative pulses of wave G. This means that all of waves G, H, I and J are now advanced in time to a position where they agree in time with the pulses of the wave A, that is, the radiated pulses. Thus these radiated pulses appear upon the cathode ray screen and produce an indication such as that shown at 28' bisected by the line 125. Of course the calibration 29 appears as before and one of the more intense indicia 126 produced therein should align with the indications 28' of the radiated pulse. If it does not, adjustment therefore may be made in device 17.

Sometimes when a deflection 28' produced by a received echo agrees rather closely with one of the larger indicia of the calibration 29, the accuracy of reading of distance can be increased by reducing all the indicia to the size of the smaller of them. This is effected by operating push button 160 shown in the right hand portion of Fig. 2. This push button then renders amplifier 99 inoperative by breaking its input circuit and connecting its control electrode to ground so the only wave supplied to conductor 100 is the harmonic wave supplied through circuits 104 and amplifier 105. Thus all pulses of wave 106 are then of the same size and all indicia of calibration 29 are alike.

In Fig. 4 I have shown a different arrangement for producing the numerical scale of the cathode ray device. In this figure the device 15 is shown as before having the indications 28' and the calibration 29 indicated as before. The disk 34, however, is replaced by a calibrated band 134 which extends about reels 135 and 136 and about an idler pulley 137 having a crank 139. The idler pulley 137 is provided with pins 140 projecting through a row of apertures 143 along the edge of the band 134. The upper edge of the band bears the scale markings, shown in Fig. 4 as 8, 9, 10, etc. at 144. The reels 135 and 136 are provided with oppositely wound springs 145 and 146 to maintain the band 134 taut. By rotating the crank 139 it will be observed that the band is wound off one of the reels 135, 136 and onto the other, the scale markings passing before the viewing screen of the cathode ray device.

The shaft of the drum 137 is connected through gears of suitable ratio 147 to the movable contact 33 on the potentiometer 30 thereby relating the movement of the band 134 with the time delay produced by the delay multivibrator.

Fig. 5 shows optical means for producing the numerical scale upon the viewing screen. In this case a card 150 is placed adjacent the viewing screen in close proximity to the calibration 29. The numerical values applying to the different indicia of the calibration 29 are projected upon this card by means of light emanating from a source 153 and concentrated by a lens 154 upon a transparent disk 155 on which opaque numerals to be indicated appear in an annular ring about the disk. The light which is transmitted through the disk is then projected by a lens 156 upon a mirror 157 and reflected upon the card 150. The disk 155 is mounted for rotation with the contact 33 which rotates over the potentiometer 30 by means of the crank 139 in accord with the delay produced by the delay multivibrator.

While I have shown a particular form of my invention, it will of course be understood that I do not wish to be limited thereto since different modifications both in the circuit arrangement and in the instrumentalities may be made, and I contemplate by the appended claims to cover all such modifications as fall within the true spirit and scope of my invention.

What I claim as new and desire to secure by Letters Patent of the United States is:

1. In combination, means to transmit periodic pulses and to receive echoes thereof in the time interval between successive pulses, means to produce during said interval a succession of timing pulses spaced in fixed time relation to said transmitted pulses, a viewing screen, means to indicate on said screen all of said timing pulses and received echoes occurring in a small portion of said interval in space relation corresponding to the time relation of their occurrence, said timing pulses being spaced apart by unit intervals of a duration corresponding to the time transpiring between transmission of a pulse and reception of its echo from a preselected unit of distance, whereby said pulse indications provide a calibration of said viewing screen, means to vary the time position of said small portion within said first time interval, and means comprising a movable index cooperating with said calibration continuously to identify each of the visible pulse indications in terms of the number of said unit intervals between said transmitted pulse and the corresponding timing pulse.

2. In combination, means to transmit periodic pulses and to receive echoes thereof in the time interval between successive pulses, a viewing screen, means to produce during said interval a succession of range pulses spaced equally in time by amounts corresponding to desired units of distance, means to indicate on said viewing screen only said range pulses occurring during a short range aperture within said interval and to indicate thereon echoes received during said aperture, all in space relation corresponding to the time relation of their receipt, whereby said pulse indications form a range calibration in terms of distance from which echoes indicated on said screen are received, means to adjust the time position of said range aperture within said interval, and mechanical indicating means controlled by said adjusting means and cooperating with said calibration for continuously identifying the echo distance to which each visible pulse indication corresponds.

3. In combination, means to radiate recurrent pulses and to receive echoes thereof during the interval between successive pulses, a viewing screen, means to produce on said viewing screen an indication of any echo received in a relatively short portion only of said interval in space position on said screen corresponding to its time of receipt in said portion of said interval, means to produce during said portion a series of indicia pulses equally spaced in time and to indicate said indicia pulses on said screen in space relation corresponding to the time relation in which they occur, thereby to produce a calibration across said screen, control means for varying the time position of said short portion over a range within said time interval, a movable scale bearing numerical markings adapted to register with and to identify each of said pulse indications in terms of a function of the total time between each transmitted pulse and the corresponding indicia pulse, and means responsive to operation of said control means for maintaining said scale in correct register with said indications over said range.

4. In combination, means to radiate periodic pulses and to receive echoes thereof in the time interval between successive pulses, a cathode ray device having a viewing screen, means to indicate on said viewing screen only echoes received in a short portion of said interval having a variable time spacing therein as measured from the previously transmitted pulse, said echo being indicated thereon in position corresponding to the time of its receipt in said portion of said interval, means to control said cathode ray device to produce across said screen electronically a calibration having indicia dividing said portion of said interval into arbitrary units of time, whereby the position of the indication of said echo may be compared with said indicia, mechanically controlled means for adjusting said variable spacing and the positions of said indicia on said screen, and means responsive to adjustment of said preceding means for continuously identifying each of said indicia in terms of the whole time between said transmitted pulse and said indicia.

5. In combination, means to radiate periodic pulses and to receive echoes thereof in the time interval between said pulses, a cathode ray device having a viewing screen, means to indicate on said viewing screen any echo received in a short portion only of said interval variably spaced therein from the previously transmitted pulses, said echo being indicated thereon in space position corresponding to the time of its receipt in said portion of said interval, means to adjust said short portion to any desired time position within said time interval, means to control said cathode ray device to produce across said screen electronically a calibration having indicia dividing said portion of said interval into arbitrary units of time whereby the position of the indication of said echo may be compared with said calibration, means to relate said calibration to the whole time between the radiated pulse producing the echo and the units of time represented by said calibration, means to produce a numerical scale cooperating with said calibration and identifying each of said indicia in terms of a function of its time spacing from said radiated pulse, and means responsive to actuation of said adjusting means to move said scale to maintain it continuously in correct register with said indicia.

6. The combination of means to transmit recurrent pulses and to receive echoes thereof in the intervals between said pulses, a cathode ray device having a viewing screen, means to deflect the ray of said device across said screen alternately in parallel paths during a short portion of said intervals, means to deflect said ray from one of said paths in accord with any echo received during said portion of said interval, means to generate periodic pulses during said portion of said interval in fixed time relation to the radiated pulses and to deflect said ray from the other of said paths in accord with said periodic pulses, whereby said periodic pulses produce regularly spaced indicia along said second path to which echo deflections from the first path may be compared in time, means to vary the time between the radiated pulse and the beginning of said portion of said interval, said last means having a calibrated scale, and means to vary said scale in accord with the variations in time between said radiated pulse and the beginning of said portion of said interval, said scale being positioned adjacent said viewing screen and relating said indicia to said radiated pulses.

7. The combination of means to transmit recurrent pulses and to receive echoes thereof in the intervals between said pulses, means to generate periodic pulses in said interval in fixed time relation to the radiated pulse, a cathode ray device having a viewing screen, means to generate pulses synchronous with said transmitted pulses and variable in length, means responsive to termination of said variable length pulses to sweep said ray across said screen in a time short relative to said interval, means to modulate said ray during alternate sweeps by echoes received during the respective sweep and by said periodic pulses during intermediate sweeps whereby said periodic pulses produce regularly spaced indicia on said screen and said echo produces an indication related thereto in space as said received echo is related to said periodic pulses in time, and means to vary the length of said variable length pulses, said last means having a calibrated scale varying with the length of the variable length pulses and arranged in juxtaposed relation to said indicia on said screen to relate said indicia to the length of said variable length pulses.

8. The combination of means to transmit recurrent pulses and to receive echoes thereof in the time intervals between said pulses, a cathode ray device having a viewing screen, means to operate said device during a short portion only of said intervals variably spaced therein and to produce upon said viewing screen an indication of any echo received in said portion at space position corresponding to the time position of its receipt in said portion, means for adjusting the time position of said short portion relative to said transmitted pulses, means to produce a numerical scale adjacent said screen calibrated in terms of the echo ranges, and means to move said scale synchronously with actuation of said adjusting means to indicate continuously the range from which any indicated echo is received synchronously with variations of the time of said portion in said intervals, said scale relating any received echo indicated on said screen to the transmitted pulse in time whereby the range from which the indicated echo is received may be observed from the calibration index adjacent the echo indication.

9. The combination of means to transmit recurrent pulses and to receive echoes thereof in the intervals between said pulses, a cathode ray device having a viewing screen, means to operate said device during a short portion of said intervals variably spaced therein and to produce upon said viewing screen an indication of any echo received in said portion at space position corresponding to the time position of its receipt in said portion, means to produce adjacent said screen a calibrated scale variable synchronously with variations of the time of said portion in said intervals, said scale relating the received echo to the transmitted pulse in time, and means to produce electronically upon said screen a calibration having indicia spaced apart by intervals corresponding to units of distance and moving thereon synchronously with movement of said scale.

10. In combination, means to transmit periodic pulses and to receive echoes thereof from distant objects within the time interval between successive pulses, means to produce during said interval a succession of timing pulses spaced equally in time and in fixed time relation to said transmitted pulses, a viewing screen, means to produce on said screen, during only a relatively small fraction of said time interval embracing at least three of said timing pulses, visible indications of timing pulses and of received echoes occurring within said fraction, said indications having relative space positions on said screen corresponding to their time positions within said interval, and means comprising a calibrated scale adjacent said indications to identify the timing indications produced by said timing pulses continuously with corresponding echo distances.

11. In combination, means to transmit periodic pulses and to receive echoes thereof from distant objects within the time interval between successive pulses, means to produce during said interval a succession of timing pulses spaced equally in time and in fixed time relation to said transmitted pulses, a viewing screen, means to produce on said screen, during only a fractional portion of said interval, visible indications of range pulses and of received echoes occurring during said portion, said indications having relative space positions on said screen corresponding to their time positions within said interval, mechanically controlled means for electrically adjusting the time position of said fractional portion within said time interval, means comprising a movable calibrated scale to identify the range indications produced by said range pulses with corresponding echo ranges, and means for simultaneously actuating said mechanically controlled means and said scale to maintain said scale in correct register with said range indications for all time positions of said fractional portion.

12. In combination, means to transmit periodic pulses and to receive echoes thereof from distant objects in the time interval between successive pulses, means to produce during said interval a succession of timing pulses spaced equally in time and in fixed time relation to said transmitted pulses, a viewing screen, means to produce on said screen, during only a small time aperture within said time interval, indications of received echoes and also a calibration having timing indicia corresponding in space positions to the time positions of said timing pulses, whereby said echo indications may be compared visually with said timing indicia, mechanically controlled means for electrically adjusting the time position of said aperture within said time interval, said indications and indicia moving across said screen as said last means is adjusted, and a calibrated scale controlled by said last means to move across said screen in register with the movement of said indicia, said scale markings continuously identifying the visible indicia with corresponding echo distances.

13. In combination, means to transmit periodic pulses and to receive echoes thereof from distant objects within the time interval between successive pulses, means to produce during said interval a succession of timing pulses spaced equally in time and in fixed time relation to said transmitted pulses, a viewing screen, means to produce on said screen, during only a relatively small fraction of said time interval, visible indications of timing pulses and of received echoes occurring within said fraction, said indications having relative space positions on said screen corresponding to their time positions within said interval, means to vary the time position of said small fraction within said time interval, and means comprising a movable calibrated scale continuously to identify the visible timing indications with corresponding echo distances.

14. The combination of means to transmit recurrent pulses and to receive echoes thereof within the time intervals between successive pulses, means to generate periodic timing pulses in fixed phase relation to said transmitted pulses, a cathode ray device having a viewing screen, means to operate said device to produce indications on said screen of echoes and timing pulses occurring within only a fraction of said interval, said indications having space sequence corresponding to the time sequence of occurrence of said echoes and timing pulses, mechanically controlled means for adjusting the time position of said fraction within said interval, whereby said indications move across said screen with adjustment of said controlled means, a movable scale adjacent said screen, and means responsive to adjustment of said preceding means for moving said scale in unison with the movement of said indications across said screen.

FRANKLIN G. PATTERSON.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,143,035 | Smith | Jan. 10, 1939 |
| 2,178,074 | Jakel et al. | Oct. 31, 1939 |
| 2,300,999 | Williams | Nov. 3, 1942 |
| 2,312,761 | Hershberger | Mar. 2, 1943 |
| 2,395,966 | Goldberg | Mar. 5, 1946 |
| 2,405,238 | Seeley | Aug. 6, 1946 |
| 2,405,239 | Seeley | Aug. 6, 1946 |
| 2,416,088 | Deerhake | Feb. 18, 1947 |

FOREIGN PATENTS

| Number | Country | Date |
| --- | --- | --- |
| 552,072 | Great Britain | Mar. 22, 1943 |